United States Patent
Wu et al.

(10) Patent No.: US 9,763,525 B2
(45) Date of Patent: Sep. 19, 2017

(54) TRANSPARENT DISPLAY DEVICE

(71) Applicant: BOE Technology Group Co., Ltd., Beijing (CN)

(72) Inventors: Zhongbao Wu, Beijing (CN); Ruoyu Ma, Beijing (CN); Zezhou Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 213 days.

(21) Appl. No.: 14/422,880

(22) PCT Filed: Jul. 31, 2014

(86) PCT No.: PCT/CN2014/083433
§ 371 (c)(1),
(2) Date: Feb. 20, 2015

(87) PCT Pub. No.: WO2015/081714
PCT Pub. Date: Jun. 11, 2015

(65) Prior Publication Data
US 2016/0045037 A1 Feb. 18, 2016

(30) Foreign Application Priority Data

Dec. 5, 2013 (CN) .......................... 2013 1 0654149

(51) Int. Cl.
*A47F 3/00* (2006.01)
*A47B 23/04* (2006.01)
(Continued)

(52) U.S. Cl.
CPC ............ *A47F 3/001* (2013.01); *A47B 23/042* (2013.01); *A47F 3/002* (2013.01); *A47F 3/005* (2013.01);
(Continued)

(58) Field of Classification Search
CPC .......... A47F 3/001; A47F 3/002; A47F 3/005; A47B 23/042; F21S 4/003; G02F 1/133615
See application file for complete search history.

(56) References Cited

U.S. PATENT DOCUMENTS

2012/0139903 A1* 6/2012 Rush ................. G02F 1/133615
345/419
2013/0107160 A1* 5/2013 Kim .......................... G09F 9/35
349/58
(Continued)

FOREIGN PATENT DOCUMENTS

CN 102819989 A 12/2012
CN 102819989 A 12/2012
(Continued)

OTHER PUBLICATIONS

Feb. 14, 2016—(CN)—Second Office Action Application 201310654149.7 with English Tran.
(Continued)

*Primary Examiner* — Mary Ellen Bowman
(74) *Attorney, Agent, or Firm* — Banner & Witcoff, Ltd.

(57) ABSTRACT

A transparent display device, comprising a display panel for transparency display, a base and a system light source; one side edge of the display panel being mounted to the base; the system light source comprising a first light source; wherein the first light source is mounted on a side edge of the display panel away from the base, and/or is mounted to the base and located at the light incident side of the display panel, light emitted from the first light source is irradiated onto the display panel after reflection by an object placed at the light incident side of the display panel to form a spatial light.

20 Claims, 5 Drawing Sheets

(51) Int. Cl.
G02F 1/1335 (2006.01)
F21S 4/20 (2016.01)
(52) U.S. Cl.
CPC .......... F21S 4/20 (2016.01); G02F 1/133615 (2013.01); *G02F 2001/133616* (2013.01)

(56) References Cited

U.S. PATENT DOCUMENTS

2013/0314923 A1    11/2013  Seo et al.
2014/0078407 A1*    3/2014  Green ..................... G09F 9/35
                                                          348/836

FOREIGN PATENT DOCUMENTS

| CN | 202660853 U | 1/2013 |
| CN | 202976766 U | 6/2013 |
| CN | 202976766 U | 6/2013 |
| CN | 203008680 U | 6/2013 |
| CN | 103426367 A | 12/2013 |
| CN | 103426367 A | 12/2013 |
| CN | 103676314 A | 3/2014 |
| KR | 101161114 B1 | 6/2012 |

OTHER PUBLICATIONS

Jun. 7, 2016—International Preliminary Report on Patentability Appn PCT/CN2014/083433.
International Search Report and Written Opinion mailed Feb. 11, 2014(PCT/CN2014/083433); ISA/CN.
Oct. 9, 2015(CN) First Office Action—App 201310654149.7.
Oct. 9, 2015—(CN) First Office Action—App 201310654149.7—English translation.

* cited by examiner

TRANSPARENT DISPLAY DEVICE

The application is a U.S. National Phase Entry of International Application No. PCT/CN2014/083433 filed on Jul. 31, 2014, designating the United States of America and claiming priority to Chinese Patent Application No. 201310654149.7 filed on Dec. 5, 2013. The present application claims priority to and the benefit of the above-identified applications and the above-identified applications are incorporated by reference herein in their entirety.

TECHNICAL FIELD

Embodiments of the present disclosure relates to a transparent display device.

BACKGROUND

With the development of display technology, and people's increasing demand for use of portable information media, in recent years, people have carried on positive studies on a transparent display device, on which an image can be displayed, and which can also make an object behind it visible. At present, transparent display devices are usually used as transparent windows for exhibiting articles.

Currently, a display panel (such as TFT-LCD) can be used as a transparent display device so as to achieve transparent display, and in view of the fact that the display panel does not emit light itself, it is necessary to provide the display panel with a corresponding system light source. For example, it is possible that a LED light bar is used as a system light source, so that light emitted by the LED light bar enters a transparent light guiding plate from its side, the transparent light guiding plate is disposed at the light incident side of the display panel, and light emitted by the system light source is guided by the transparent light guiding plate to enter the display panel for display. Or, for example, it is possible for a lamp box to be used as a system light source for a display panel, that is, articles to be exhibited are placed within the transparent lamp box, the display panel is disposed on one side of the transparent lamp box, and a backlight source is arranged on other side of the lamp box, for transparency display.

Providing a transparent light guiding plate at a light incident side of a display panel will affect the overall transparency of the transparent display device, and then, it will further affect observing exhibited articles that are placed behind the transparent display device; while in the case that a lamp box is used, both the volume and weight of a transparent display device are relatively great, and this goes against lighting and thinning of the transparent display device.

SUMMARY

Embodiments of the present disclosure provide a transparent display device, so as to obtain a transparent display device that has a high transparency and is light and thin.

At least one embodiment of the present disclosure provide a transparent display device, comprising a display panel for transparency display, a base and a system light source; one edge of the display panel being mounted to the base; the system light source comprising a first light source;

wherein the first light source is mounted on a side edge of the display panel away from the base, light emitted from the first light source is incident to the display panel reflected by an object placed at the light incident side of the display panel to form a spatial light; and/or the first light source is mounted to the base and located at the light incident side of the display panel, light emitted from the first light source are irradiated onto the display panel after reflected by an object placed at the light incident side of the display panel so as to form a spatial light.

With respect to the above transparent display device provided by embodiments of the present disclosure, in view of the fact that a first light source mounted to a base and/or mounted on an edge of a display panel facing away from the base is used as a system light source, light emitted from a first light source that is mounted on a side edge of the display panel away from the base to the lower back side of the display panel and light emitted from a first light source that is mounted to the base to the upper back side of the display panel are irradiated onto an object that is placed behind the display panel, and will form a spatial light directly behind the display panel after reflected by the object (which is usually diffused reflection). The spatial light is equivalent to ambient light, and is irradiated onto the display panel so as to achieve transparency display. Relative to an existing transparent display device, a light guiding plate disposed behind a display panel can be eliminated, so as to avoid influence on transparency of the transparent display device by the light guiding plate. Furthermore, whether the first light source is mounted on the base or mounted on an edge of the display panel away from the base, thickness of the transparent display device will not increase in each case, and as compared to the system light source such as a light box used in a transparent display device, this facilitates lightening and thinning of the transparent display device.

In an embodiment according to the present disclosure, for making the spatial light formed directly behind the display panel more uniform, in the above transparent display device provided by embodiments of the present disclosure, the system light source further comprises a second light source;

the second light source is mounted on at least one side edge of the display panel, and light emitted from the second light source is irradiated to the display panel after reflected by an object placed at the light incident side of the display panel to form a spatial light.

In an embodiment according to the present disclosure, each of the first light source and the second light source is a strip-like light source.

In an embodiment according to the present disclosure, in the above transparent display device provided by embodiments of the present disclosure, the display panel comprises a front frame and a back frame that are fixedly connected, and a display panel confined between the front frame and the back frame;

the back frame and the base are fixedly connected;

the first light source is mounted on an edge of the display panel away from the base, the front frame has a slot for containing the first light source, and the back frame has a depression bar for confining the first light source within the slot;

the second light source is mounted on a side edge of the display panel, the front frame has a slot for containing the second light source, and the back frame has a depression bar for confining the second light source within the slot.

In an embodiment according to the present disclosure, for protecting the display panel, in the above transparent display device provided by embodiments of the present disclosure, the display panel further comprises a transparent guard plate disposed between the display panel and the front frame.

In an embodiment according to the present disclosure, for making the transparent display device more attractive in appearance, in the above transparent display device provided by embodiments of the present disclosure, when the first light source is mounted on a side edge of the display panel away from the base, an wiring slot for lay-up of wirings of the first light source is further disposed at a side of the back frame facing the front frame;

the second light source is mounted on at least one side edge of the display panel, a wiring slot for lay-up of wirings of the second light source is further disposed at a side of the back frame facing the front frame.

In an embodiment according to the present disclosure, in the above transparent display device provided by embodiments of the present disclosure, the back frame and the front frame are fixedly connected together by a screw, or, the back frame and the front frame are engaged together.

In an embodiment according to the present disclosure, in the above transparent display device provided by embodiments of the present disclosure, the back frame and the base are fixedly connected together by a screw.

In an embodiment according to the present disclosure, in the above transparent display device provided by embodiments of the present disclosure, the base comprises: an upper housing and a counterweight plate that are fixedly engaged, and at least one pin board, fixed to the counterweight plate and fixedly connected to the back frame;

the first light source is mounted on the base, and a base plate of the counterweight plate together with the upper housing form a slot for containing the second light source.

In an embodiment according to the present disclosure, the above transparent display device provided by embodiments of the present disclosure, further comprises a circuit board located between the upper housing and the counterweight plate and fixed to the counterweight plate;

the circuit board is electrically connected to the display panel; the circuit board is electrically connected to the system light source.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 2b is an enlarged view of region A in FIG. 2a;

FIG. 2c is an enlarged view of region B in FIG. 2a;

FIG. 3b is an enlarged view of region C in FIG. 3a;

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The shapes or sizes of components in the figures do not reflect the actual scale of a transparent display device, and the purpose is merely to schematically illustrate contents of the present disclosure.

Figure 1A:
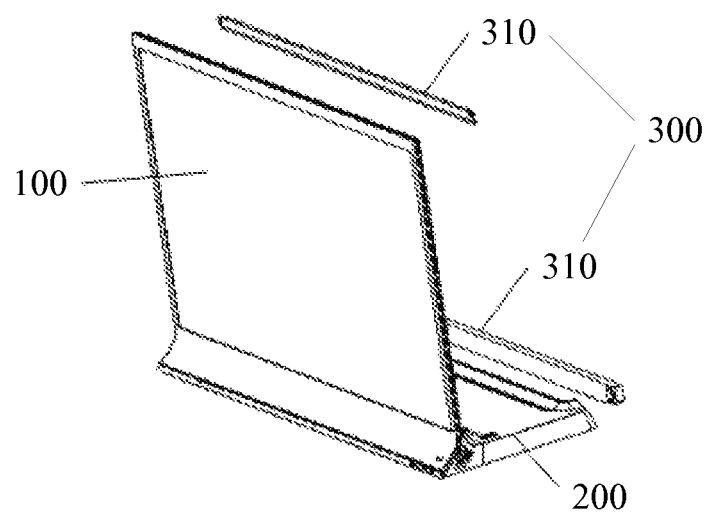
FIG. 1a to FIG. 1c are structure views respectively schematically illustrating a transparent display device according to an embodiment of the present disclosure.
Figure 1B:
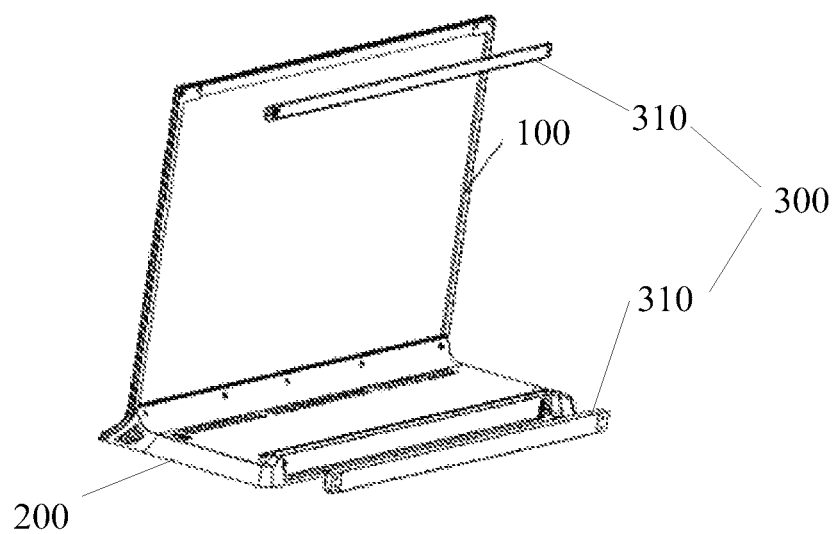

According to at least one embodiment of the present disclosure, a transparent display device is provided. As illustrated in FIG. 1a and FIG. 1b, the transparent display device comprises a display panel 100, a base 200 and a system light source 300; wherein one side edge of the display panel 100 is mounted to the base 200;

the system light source 300 comprises a first light source 310;

the first light source 310 is mounted on a side edge of the display panel 100 away from the base 200, and light emitted from the first light source 310 is reflected by an object placed at the light incident side of the display panel 100 to form a spatial light and then is irradiated onto the display panel 100; and/or the first light source 310 is mounted to the base 200 and located at the light incident side of the display panel 100, and light emitted from the first light source 310 is reflected by an object placed at the light incident side of the display panel 100 to form a spatial light and then is irradiated onto the display panel 100.

It should be noted that, in the above transparent display device provided by embodiments of the present disclosure, the display panel 100 generally refers to a liquid crystal display panel; of course, it does not exclude any other display panel that requires a system light source, either.

The above transparent display device according to embodiments of the present disclosure is usually used as a transparent window for exhibiting articles, namely, articles for to be exhibited can be placed behind (at the light incident side of) the transparent display device. Of course, at the back side of the transparent display device, other objects (such as walls, etc.) rather than the article for exhibition can also exist. In the embodiment, a first light source 310 as a system light source can be mounted on a side edge of the display panel 100 away from the base 200. In this case, light emitted from the first light source 310 to the lower back side of the display panel 100 is irradiated onto an object (which can refer to an exhibited article, and can also refer to an object such as a wall, or the like) that is placed behind the display panel 100, and after reflection (which is usually diffused reflection) by the object, it will form a spatial light directly behind the display panel 100. The spatial light is equivalent to ambient light, and is irradiated onto the display panel 100 so as to achieve transparency display. Compared to existing transparent display devices, a light guiding plate disposed behind a display panel can be eliminated, so as to avoid influence on transparency of the transparent display device by the light guiding plate, and the first light source 310 is mounted on a side edge of the display panel 100, so that thickness of the transparent display device will not increase. Furthermore, compared to a traditional case where a lamp box is adopted as a system light source for a transparent display device, this facilitates lightening and thinning of the transparent display device.

In the embodiment, it is also possible for the first light source 310 as a system light source to be mounded onto the base 200 and be located at the light incident side of the display panel 100. Light emitted from the first light source 310 to the upper back side of the display panel 100 is irradiated onto an object that is placed behind the display panel 100, and after reflection (which is usually diffused reflection) by the object, it will form a spatial light directly behind the display panel 100. The spatial light is equivalent to ambient light, and is irradiated onto the display panel 100 so as to achieve transparency display. As in the case that the first light source 310 is mounted to a side edge of the display panel 100 away from the base, compared to existing transparent display devices, a light guiding plate disposed behind the display panel can be eliminated, so as to avoid influence on transparency of the transparent display device by the light guiding plate, and the first light source 310 is mounted on the base, so that thickness of the transparent display device will not increase. Furthermore, compared to a traditional case where a lamp box is adopted as a system light source for a transparent display device, it facilitates lightening and thinning of the transparent display device. Whether the first light source 310 is mounted on a side edge of the display panel 100 away from the base 200, or it is mounted on the base 200 and located at the light incident side of the display panel 100, the first light source 310 is not located between the display panel and a placed article for exhibition in each case, so as to avoid influence on transparency of the transparent display device by the system light source, and influence on observation of an exhibited article.

According to an embodiment of the present disclosure, in the above transparent display device, it is possible for the first light source to be mounted on a side edge of the display panel 100 away from the base 200 and meanwhile be mounted on the base 200 and located at the light incident side of the display panel 100. As compared to the case where the first light source is mounted on a side edge of the display panel 100 away from the base 200 or is merely mounted on the base 200, a spatial light formed directly behind the display panel has a uniform illumination effect, and this helps effect of the transparency display.

Figure 1C:
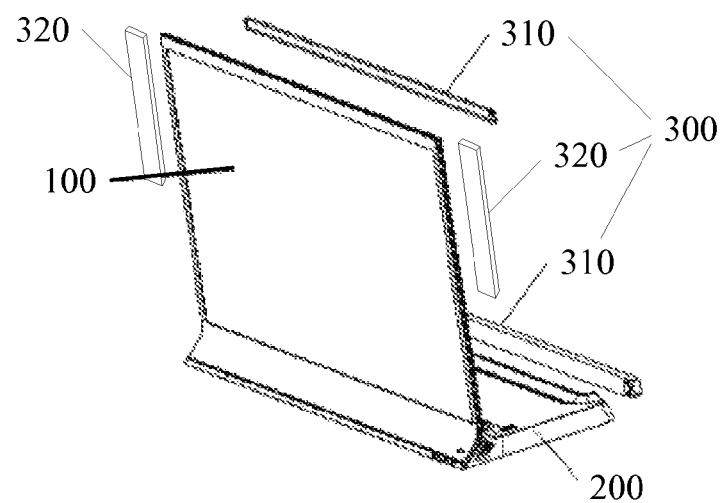

Further, for making a spatial light formed directly behind the display panel 100 uniform, in the above transparent display device provided by embodiments of the present disclosure, as illustrated in FIG. 1c, the system light source 300 can further comprise a second light source 320;

the second light source 320 is mounted on one or two of side edges of the display panel 100, and light emitted from the second light source 320 is irradiated to the display panel 100 after reflected by an objected placed at the light incident side of the display panel 100 to form a spatial light.

It should be noted that, after the second light source 320 is mounted on each of two side edges (left and right side edges) of the display panel 100 in the liquid crystal display device, although uniformity of the spatial light formed directly behind the display panel 100 can be enhanced, the second light sources 320 disposed on two side edges (left and right side edges) of the display panel 100 goes against narrowing the frame of the display panel 100. Therefore, it is possible to determine whether or not the system light source comprises a second light source 320 according to actual requirements, and it will not be limited here.

Further, for making light emitted from the system light source 300 more uniform, in the above transparent display device provided by embodiments of the present disclosure, the first light source 310 and the second light source 320 can adopt a strip-like light source, and can adopt a LED light source, and it will not be limited here.

The structure of the display panel 100 of the above transparent display device according to embodiments of the present disclosure will be explained below.

Figure 2A:
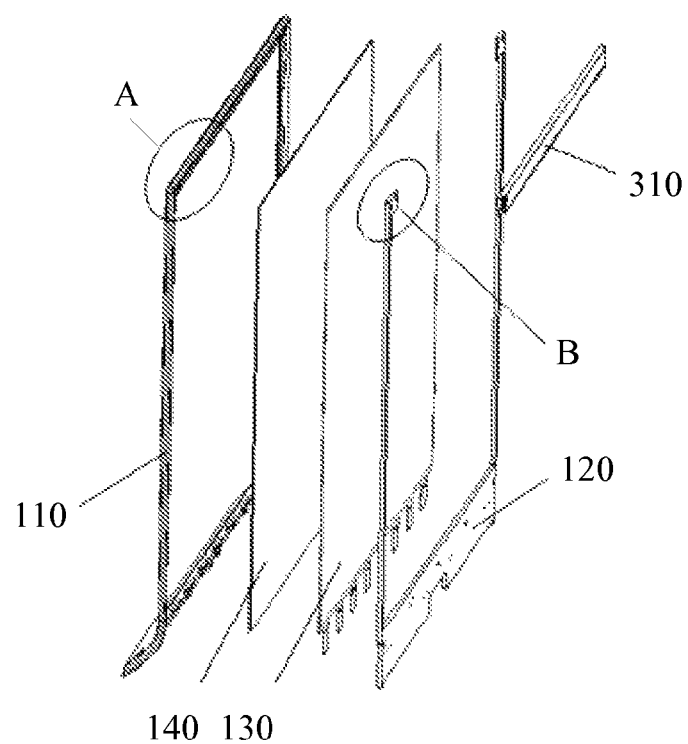
FIG. 2a is an exploded structural view schematically illustrating a display panel in a transparent display device according to an embodiment of the present disclosure.

As illustrated in FIG. 2a, the display panel 100 can comprise a front frame 110 and a back frame 120 that are fixedly connected, and a display panel 130 confined between the front frame 110 and the back frame 120. The back frame 120 is fixedly connected to the base 200.

Figure 2B:
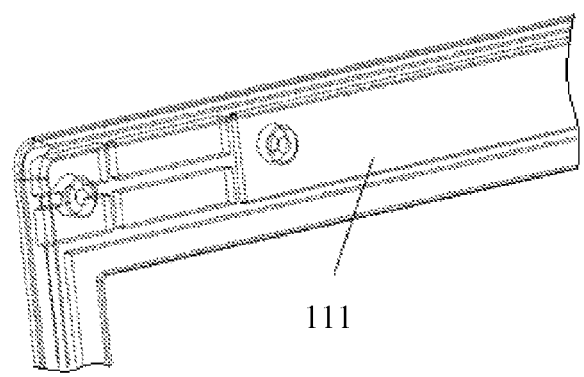
Figure 2C:
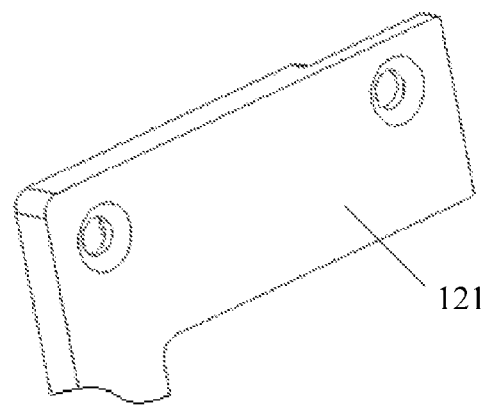

When the first light source 310 is mounted on a side edge of the display panel 100 away from the base, as illustrated in FIG. 2b that is an enlarged view of region A in FIG. 2a, the front frame 110 comprises a slot 111 for containing the first light source 310; as illustrated in FIG. 2c that is an enlarged view of region B in FIG. 2a, the back frame 120 has a depression bar 121 for confining the first light source 310 within the slot 111.

Likewise, when the system light source 300 comprises a second light source 320, supposing that the second light source 320 is mounted on one side edge of the display panel 100, the front frame 110 comprises a slot for containing the second light source 320, and the back frame 120 has a depression bar for confining the second light source 320 within the slot. Further, supposing that second light sources 320 are mounted on two side edges of the display panel 100, there is a slot for containing a light source 320, on each of two side edges of the front frame 110, and the back frame 120 comprises depression bars for confining second light sources 320 within slots.

In the display panel 100 according to an embodiment of the present disclosure, as the slot and the depression bar are adopted to embed the system light source 300 within the frame of the display panel 100, so that the transparent display device can be lighter and thinner as a whole, making its appearance more attractive.

It should be noted that, in the transparent display device according to an embodiment of the present disclosure, the display panel 130 generally refers to a liquid crystal display panel; of course, it does not exclude other display panel, either.

It should be noted that, in the above transparent display device according to an embodiment of the present disclosure, the front frame can also be eliminated from the structure of the display panel, and a slot for confining a system light source is provided directly within the back frame. This facilitates achieving a design of narrow frame or no frame for the display panel. Certainly, the display panel can also be of other structures, details being omitted here.

For protecting the display panel 130, as illustrated in FIG. 2a, the display panel 100 can further comprise a transparent guard plate 140 disposed between the display panel 130 and the front frame 110. Furthermore, in order to avoid adhesion between the transparent guard plate and the display panel 130 due to deformation of the transparent guard plate 140, a rigid completely-transparent material can be used to make the transparent guard plate 140.

Further, a touch technology can also be applied to the display panel 100, that is, the display panel 100 can further comprise a touch module disposed between the display panel 130 and the transparent guard plate 140. As structure of the touch module belongs to techniques known by the inventor, it will not be described in detail here. It is possible to first fabricate each hierarchical structure of the touch module, and then attach the fabricated touch module directly to a light emitting side of the display panel; or, it is possible to directly fabricate each hierarchical structure of the touch module at a light emitting side of a base substrate for a color filter substrate of the display panel. No limitation will be set herein.

Still further, an embedded touch technology can also be adopted in the above display panel 100, that is, each hierarchical structure making up a touch structure is directly fabricated in the display panel so as to form an embedded touch panel. There are many manners for implementing an embedded touch panel, and they will be described in detail here.

Figure 3A:
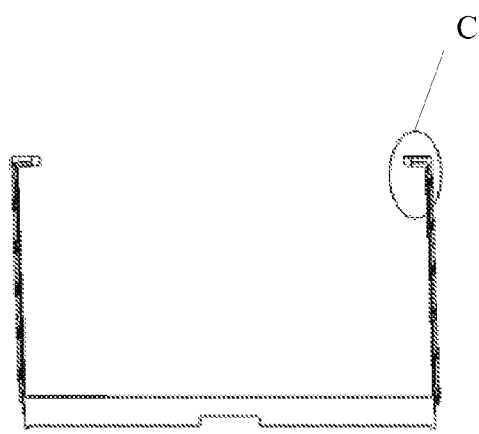
FIG. 3a is a structural view schematically illustrating a side of a back frame facing a front frame in a display panel according to an embodiment of the present disclosure.
Figure 3B:
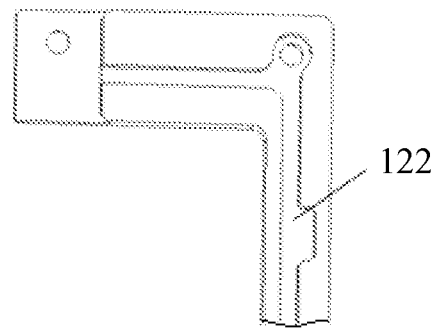

For making the transparent display device more attractive in appearance, in the above display panel 100, when the first light source 310 is mounted on a side edge of the display panel 100 away from the base 200, as illustrated in FIG. 3b that is an enlarged view of region C in FIG. 3a, a wiring slot 122 for lay-up of wirings of the first light source 310 is disposed on a side of the back frame 120 facing the front frame 110;

likewise, when the system light source 300 comprises a second light source 320, a wiring slot for lay-up of wirings of the second light source 320 is further disposed on a side of the back frame 120 facing the front frame 110.

For facilitating reflection of the system light source by an object at the light incident side of the display panel so as to provide light to the display panel, opening of the wiring slot for lay-up of wiring of the system light source (e.g. a wiring slot 122 for lay-up of wirings of the first light source 310) each orients toward the object at the light incident side of the display panel.

Further, an opening direction of the wiring slot for lay-up of wiring of a first light source and an opening direction of the wiring slot for lay-up of wiring of a second light source are perpendicular (or approximately perpendicular) to each other, and as a result, the first light source and the second light source coordinate with each other, so that a more uniform light is provided to the display panel after reflection by an object at the light incident side of the display panel.

The back frame 120 and the front frame 110 in the above display panel 100 can be fixedly connected by a screw, and FIG. 2b and FIG. 2c respectively illustrates a threaded hole of the front frame 110 and the back frame 120 that are matched with the screw. Or, the back frame 120 and the front frame 110 can be engaged together, and no limitation will be set here.

Figure 3C:
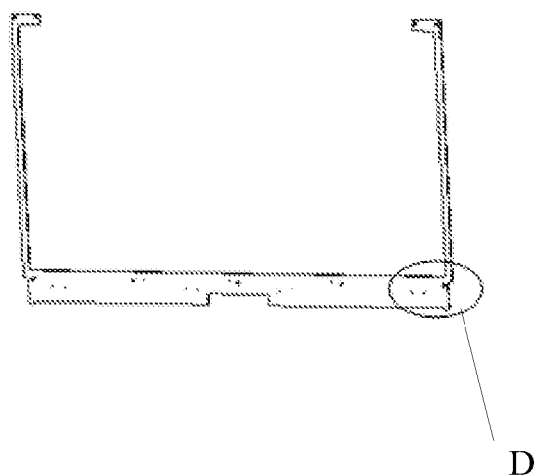
FIG. 3c is a structural view schematically illustrating a side of a back frame facing away from a front frame in a display panel according to an embodiment of the present disclosure.
Figure 3D:
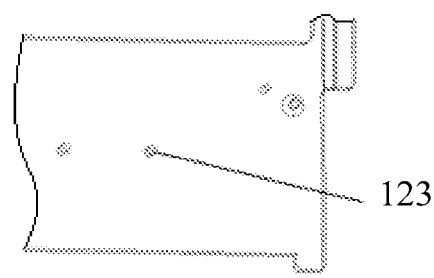
FIG. 3d is an enlarged view of region D in FIG. 3c.

The back frame 120 and the base 200 in the above display panel 100 can be fixedly connected by a screw, and FIG. 3d is an enlarged view of region D in FIG. 3c, which illustrates a threaded hole 123 of the back frame 120 that are matched with the screw.

The structure of the base 200 of the above transparent display device provided by embodiments of the present disclosure will be described below.

Figure 4:
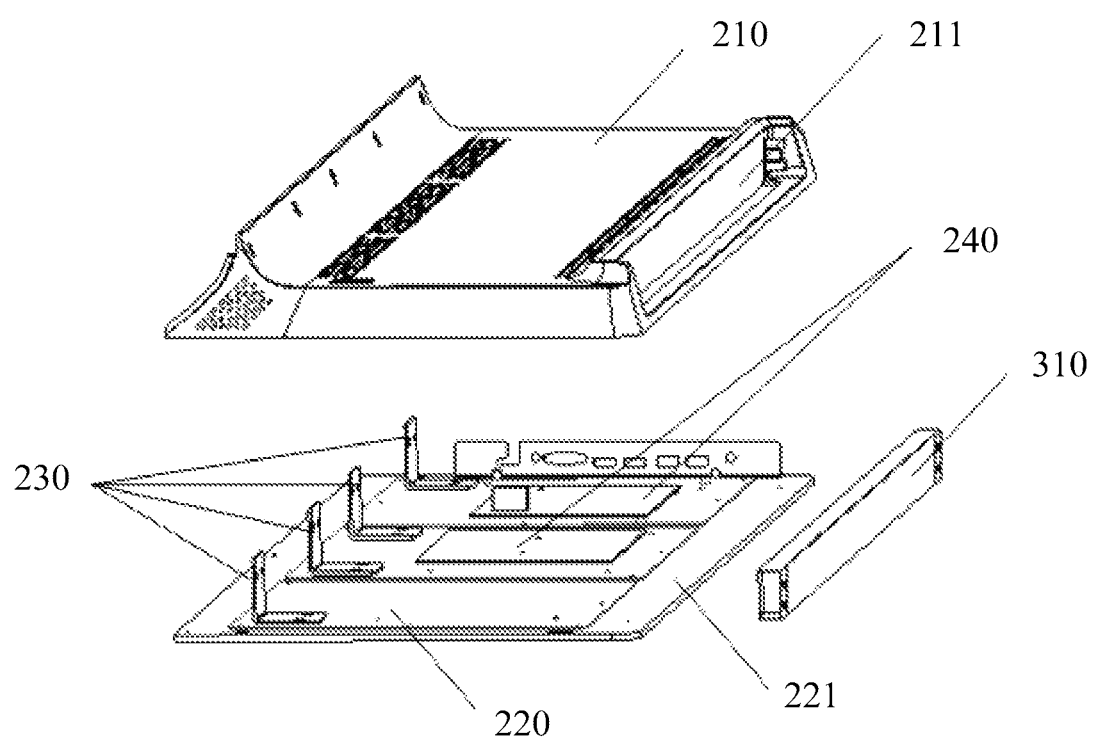
FIG. 4 is an exploded structural view schematically illustrating a base in a transparent display device according to an embodiment of the present disclosure.

As illustrated in FIG. 4, the base 200 can comprise an upper housing 210 and a counterweight plate 220 that are fastened to each other, and at least one pin board 230 that is fixed to the counterweight plate 220 and fixedly connected to the back frame 120.

When the first light source 310 is mounted onto the base, a base plate 221 of the counterweight plate 220 cooperates with the upper housing 210 so as to form a slot 211 for containing the first light source 310.

In the above base 200 according to an embodiment of the present disclosure, due to provision of the slot 211 through which the first light source 310 can be embedded in the base 200, the first light source 310 and the base 200 that make up a whole make the transparent display device more attractive in appearance when viewed as a whole.

Further, as illustrated in FIG. 4, the above base 200 provided by embodiment of the present disclosure can further comprise a circuit board 240 that are located between the upper housing 210 and the counterweight plate 220 and fixed to the counterweight plate 220. The circuit boards 240 are electrically connected to the display panel 130, for driving the display panel 130 to display.

The circuit board 240 is also electrically connected to the system light source, for controlling operation of the system light source.

A transparent display device according to embodiments of the present disclosure comprises a system light source, which comprises a first light source, which is mounted on a base and/or mounted on a side edge of a display panel away from the base and located at the light incident side of the display panel 100. When the first light source is mounted on a side edge of the display panel away from the base, lights emitted from the first light source to the lower back side of the display panel are irradiated onto an object that is placed behind the display panel, and it will form a spatial light directly behind the display panel after reflection by the object (which is usually diffused reflection). The spatial light is equivalent to ambient light, and is irradiated onto the display panel so as to achieve a transparency display. Or, when the first light source is mounded on the base and is located at the light incident side of the display panel 100, light emitted from the first light source to the upper back side of the display panel is irradiated onto an object that is placed behind the display panel, and it will form a spatial light directly behind the display panel after reflection by the object (which is usually diffused reflection). The spatial light is equivalent to ambient light, and is irradiated onto the display panel so as to achieve a transparency display. Relative to a transparent display device known by the inventor, a light guiding plate disposed behind a display panel can be eliminated, so as to avoid influence on transparency of the transparent display device by the light guiding plate. Furthermore, whether the first light source is mounted over the base or mounted on a side edge of the display panel, thickness of the transparent display device will not increase in each case, and as compared with a traditional case where a lamp box is adopted as a system light source for a transparent display device, this facilitates lightening and thinning of the transparent display device.

The foregoing are merely exemplary embodiments of the invention, but are not used to limit the protection scope of the invention. The protection scope of the invention shall be defined by the attached claims.

The present disclosure claims priority of Chinese Patent Application No. 201310654149.7, filed on Dec. 5, 2013, the disclosure of which is hereby entirely incorporated by reference.

The invention claimed is:

1. A transparent display device, comprising a display panel for transparency display, a base and a system light source; one side edge of the display panel being mounted to the base; the system light source comprising a first light source; wherein the first light source is mounted on a side edge of the display panel away from the base, and/or is mounted to the base and located at a light incident side of the display panel, light emitted from the first light source are irradiated to the display panel after being reflected by an object placed at the light incident side of the display panel to form a spatial light.

2. The transparent display device according to claim 1, wherein the system light source further comprises a second light source;

the second light source is mounted on at least one side edge of the display panel, and light emitted from the second light source are irradiated to the display panel after being reflected by the object placed at the light incident side of the display panel to form a spatial light.

3. The transparent display device according to claim 2, wherein the first light source or the second light source is a strip-like light source.

4. The transparent display device according to claim 1, wherein the display panel comprises a front frame and a back frame that are fixedly connected, and a display panel confined between the front frame and the back frame;

the back frame and the base are fixedly connected; and
the front frame has a slot for containing the first light source, and the back frame has a depression bar for confining the first light source within the slot.

5. The transparent display device according to claim 4, wherein, the front frame has a slot for containing a second light source, and the back frame has a depression bar for confining the second light source within the slot.

6. The transparent display device according to claim 1, wherein the display panel further comprises a transparent guard plate disposed between the display panel and a front frame.

7. The transparent display device according to claim 4, wherein a wiring slot for lay-up of wiring of the first light source is disposed on a side of the back frame facing the front frame.

8. The transparent display device according to claim 4, wherein a wiring slot for lay-up of wiring of a second light source is disposed on a side of the back frame facing the front frame.

9. The transparent display device according to claim 4, wherein the back frame is fixedly connected to the front frame.

10. The transparent display device according to claim 4, wherein the back frame is fixedly connected to the base.

11. The transparent display device according to claim 4, wherein the base comprises:

an upper housing and a counterweight plate that are fixedly connected to each other; and
at least one pin board, fixed to the counterweight plate and fixedly connected to the back frame;
wherein the first light source is mounted on the base and located at the light incident side of the display panel, and a base plate of the counterweight plate and the upper housing together form a slot for containing a second light source.

12. The transparent display device according to claim 11, further comprising a circuit board that is located between the upper housing and the counterweight plate and fixed to the counterweight plate;

the circuit board is electrically connected to the display panel; and
the circuit board is electrically connected to the system light source.

13. The transparent display device according to claim 2, wherein the display panel comprises a front frame and a back frame that are fixedly connected, and a display panel confined between the front frame and the back frame;

the back frame and the base are fixedly connected; and
the front frame has a slot for containing the first light source, and the back frame has a depression bar for confining the first light source within the slot.

14. The transparent display device according to claim 3, wherein the display panel comprises a front frame and a back frame that are fixedly connected, and a display panel confined between the front frame and the back frame;

the back frame and the base are fixedly connected; and
the front frame has a slot for containing the first light source, and the back frame has a depression bar for confining the first light source within the slot.

15. The transparent display device according to claim 2, wherein the display panel further comprises a transparent guard plate disposed between the display panel and a front frame.

16. The transparent display device according to claim 5, wherein a wiring slot for lay-up of wiring of the first light source is disposed on a side of the back frame facing the front frame.

17. The transparent display device according to claim 5, wherein a wiring slot for lay-up of wiring of the second light source is disposed on a side of the back frame facing the front frame.

18. The transparent display device according to claim 5, wherein the back frame is fixedly connected to the front frame.

19. The transparent display device according to claim 5, wherein the back frame is fixedly connected to the base.

20. The transparent display device according to claim 5, wherein the base comprises:

an upper housing and a counterweight plate that are fixedly connected to each other; and
at least one pin board, fixed to the counterweight plate and fixedly connected to the back frame;
wherein the first light source is mounted on the base and located at the light incident side of the display panel, and a base plate of the counterweight plate and the upper housing together form a slot for containing the second light source.

* * * * *